April 13, 1954 — N. LANGER — 2,675,054
MACHINE FOR CONTINUOUSLY BONDING THERMOPLASTIC MATERIALS
Filed Dec. 1, 1951
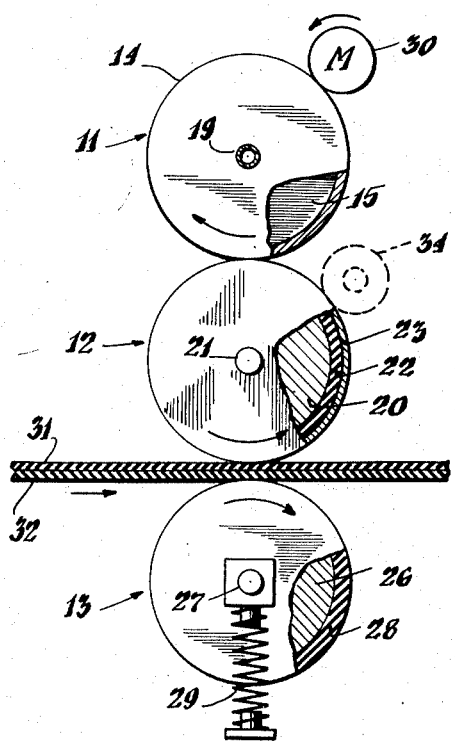
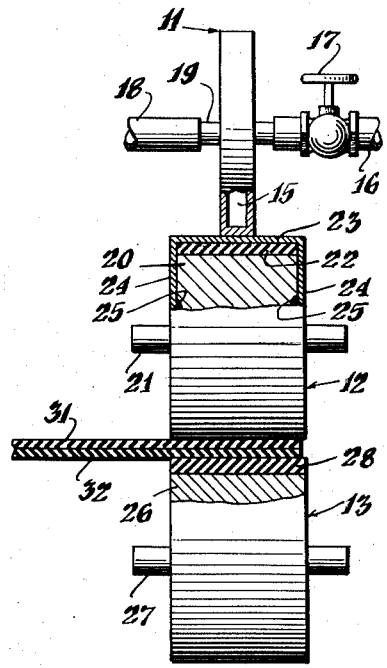
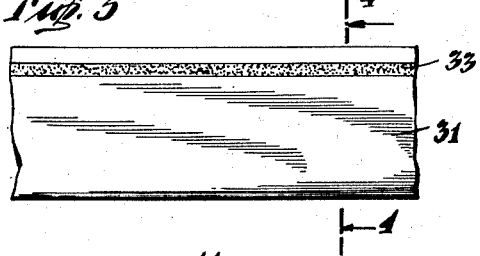
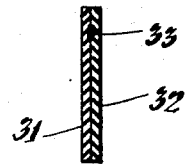
INVENTOR.
Nicholas Langer Patented Apr. 13, 1954

2,675,054

UNITED STATES PATENT OFFICE 2,675,054

MACHINE FOR CONTINUOUSLY BONDING THERMOPLASTIC MATERIALS

Nicholas Langer, New York, N. Y.

Application December 1, 1951, Serial No. 259,475

6 Claims. (Cl. 154—42)

This invention relates to the art of bonding thermoplastic materials, such as thermoplastic layers and films, and, more particularly, to a novel and improved heat sealing method and machine of the thermal impulse type.

The present application is a continuation-in-part of my co-pending application Serial No. 255,777, filed November 10, 1951, for Art of Bonding Thermoplastic Materials, and constitutes an improvement thereover.

As disclosed in my Patent No. 2,460,460, heat sealing machines of the thermal impulse type essentially comprise a pair of pressure members or bars and a reciprocating mechanism therefor whereby pressure may be applied upon two or more layers of thermoplastic film to be heat sealed interposed therebetween. Examples of the commercially most important thermoplastic films are Pliofilm (rubber hydrochloride), Vinylite (a copolymer of vinyl chloride and vinyl acetate), Polythene (polyethylene), and Saran (vinylidene chloride). A heater element in the form of a thin and narrow band of metal of high specific resistance, such as a suitable nickel-chromium alloy known in the trade as Nichrome, is mounted on the face of at least one of said bars, constituting the operating or sealing face of the machine. Sealing pulses of electric current may be passed through said heater element under the control of a switching mechanism, the operation of which is coordinated to that of the reciprocating mechanism of the bars.

During the operation of the machine, operation of the switching mechanism is initiated substantially when the pressure members arrive into their pressure-applying position. A short pulse of current is then passed through the heater element, which, as a result of its low heat capacity, is heated to heat sealing temperature in a small fraction of a second. The heat thus produced is immediately transferred by surface contact to the region of the thermoplastic layers compressed between the bars, causing heat sealing thereof. A short period thereafter, the heat produced by the pulse of current is dissipated and the seal is cooled and consolidated under pressure whereby a strong and sound seal is obtained.

Heat sealing machines of the thermal impulse type provide important advantages over the commonly used heat sealing machines in which the sealing member is continuously maintained at a constant sealing temperature. Due to the fact that the thermal impulse principle permits the sealed region to cool and to consolidate under pressure, the quality of the seal is greatly improved. Also, the thermal impulse principle makes it possible to readily seal films of materials which cannot be sealed on an industrial scale with sealing members maintained at constant temperature, such as particularly Polythene and Saran.

Although the heat sealing machines of the thermal impulse type provided excellent results and achieved remarkable commercial success within a short period after their introduction, certain practical difficulties were experienced when it was attempted to apply the thermal impulse principle for the continuous production of a longitudinally extending seal upon thermoplastic layers progressively displaced with respect to the sealing apparatus, in the complete absence of any reciprocating motion. There are many types of bag making, bag sealing, wrapping and packaging machines wherein the material worked upon is continuously displaced and in which the provision of apparatus suitable for applying the seals without the necessity of stopping the continuous flow of the materials offers distinct advantages.

I have now discovered that the outstanding problem may be solved in a remarkably simple manner.

It is an object of the present invention to improve heat sealing machines of the thermal impulse type.

It is another object of the present invention to provide an improved heat sealing machine of the thermal impulse type which is capable of forming seals or in general bonding thermoplastic materials in a continuous longitudinally extending region while progressively displacing the materials or layers.

It is also within the contemplation of the invention to provide a novel and improved heat sealing machine which permits obtaining the well-known advantages of the thermal impulse principle in the production of longitudinally extending seals of any desired length upon progressively displaced thermoplastic layers in the complete absence of step-by-step displacement or reciprocating motion.

The invention also contemplates the provision of a novel and improved method of continuously forming longitudinally extending seals upon progressively displaced layers of thermoplastic materials while realizing the advantages of the thermal impulse principle.

Other and further objects and advantages of the present invention will become apparent from the following description, taken in conjunction with the accompanying drawing, in which Fig. 1 is a side elevational view, somewhat fragmentary and diagrammatic in character and having parts in section, of a preferred embodiment of the present invention;

Fig. 2 is a front elevational view of the machine shown in Fig. 1;

Fig. 3 is a top elevational view of a portion of the thermoplastic layers after the sealing operation continuously carried out by the machine of Figs. 1 and 2;

Fig. 4 is a sectional view taken on line 4—4 of Fig. 3; and

Fig. 5 is a fragmentary front elevational view, similar to Fig. 2, of a modified embodiment of the present invention.

Broadly stated, in accordance with the principles of the present invention, I provide a heater roll having a continuous heating face constituted by its circumferential surface. This roll is preferably formed of metal of high heat conductivity, such as copper, brass, aluminum, and the like, and is maintained at a constant high temperature, which at least equals but in most practical cases somewhat exceeds the temperature that is required to cause heat sealing or bonding of the thermoplastic materials.

I further provide a sealing roll having a generally smooth circumferential surface constituting a sealing face. This sealing face may be formed of a great variety of different materials, one of the principal requirements being that the material should have a relatively low heat conductivity, for reasons which will appear more clearly as the description proceeds. In general, I prefer to use metals or alloys having a definite heat conductivity, as distinguished from heat insulators, such heat conductivity, however, being only a fraction of the heat conductivity possessed by the metals considered to be good conductors of heat, such as copper, copper alloys, or aluminum. Examples of the most common materials suitable for forming the sealing face of the sealing roll are Nichrome (a nickel base alloy containing 11–22% chromium and smaller amounts of silicon and manganese), Inconel (a nickel base heat- and oxidation-resistant alloy with approximately 13% chromium, 6% iron, small amounts of manganese, silicon and copper), and Nilvar (a high-nickel iron alloy with about 36% of nickel showing extremely low coefficient of temperature expansion).

In practicing the invention, the circumferential faces of the heater roll and the sealing roll are brought into rolling contact and the rolls are rotated in opposite directions. As a result of this rolling contact, heat will be continuously and progressively transferred to and stored in the sealing face of the sealing roll. Due to the relatively low heat conductivity of the sealing face and as the period of contact between corresponding portions of the two surfaces is a very short one, this heat will not spread out on the surface of the sealing roll but, at least for a fraction of a second, will remain thereon in the form of a distinct circumferentially extending heated area or island. In other words, while there is absolutely no change in the external appearance or smooth surface of the sealing roll, it will now bear a continuous area, region or strip of stored heat. At the first glance, it may appear strange and extremely surprising that considerable temperature gradients may exist on the surface of a single and continuous metal body, or that areas of very high sealing temperature may coexist with adjoining areas of considerably lower temperature. Practical experience with the present invention has, however, indicated that this condition is not only possible but is remarkably easy to realize as a result of the relatively low heat conductivity of the sealing face. Of course, to accomplish the objects of the present invention, the heat thus stored must be utilized as fast as possible otherwise the heated area will gradually spread until in a few seconds, or even faster, heat conduction in the sealing face will cause the stored heat to distribute uniformly over the entire sealing face. Also, the stored heat would be further reduced and eventually completely dissipated by radiation or by conduction into the base underlying the sealing face.

Immediately thereafter, the sealing roll with the heat stored in a circumferential region thereof is brought into rolling contact with the thermoplastic materials or layers to be bonded or heat sealed together. Thus, the stored heat will be continuously and progressively deposited on or transferred to the corresponding regions of the layers, causing heat sealing thereof in a continuous longitudinal strip, the width of which substantially corresponds to the width of the heated circumferential surface of the heater roll. It is further to be noted that, since the quantity of heat stored in the said circumferential region of the sealing face is a finite and limited one, upon performing the sealing operation most, if not all, of the sealing heat will be dissipated in heating up the layers to their sealing temperature so that the sealed regions will be cooled and consolidated under rolling pressure whereby a strong and very sound seal is obtained. Thus, it will be observed that the present invention makes it possible to extend the benefits of the thermal impulse principle to the continuous production of longitudinally extending seals upon progressively displaced thermoplastic layers.

The invention will now be more fully described with reference to the drawing, showing certain preferred practical embodiments of the invention.

Referring now more particularly to Figs. 1 and 2 of the drawing, the continuously operated heat sealing machine of the invention essentially comprises a heater roll 11, a sealing roll 12, and a pressure roll 13. Heater roll 11 is formed of brass or of some other metal of high heat conductivity, the circumferential portions 14 of which constitute the operative or heating face of the roll. The heater roll is adapted to be heated to a desired sealing temperature by any suitable heating means, such as an electrical heater element or, as shown in the drawing for the sake of simplicity, by passing a suitable heating fluid, such as steam, through an inner cavity 15 thereof. The heating fluid is introduced through an intake conduit 16 under the control of a valve 17 and is discharged through an outlet conduit 18. Heater roll 11 is rotatably supported on a hollow shaft 19 which at the same time also serves for the introduction and discharge of the heating fluid.

Sealing roll 12 comprises a body portion 20 of a metal rotatably supported on a shaft 21. On the circumferential surface of this body portion there is provided a layer of heat insulation 22, constituted of a material which is not adversely affected by the sealing temperatures, such as one formed of a glass fibre fabric impregnated with silicone resin. On this layer of heat insulation, which may be 0.005" to 0.03" in thickness, there is a thin layer of metal 23 of relatively low heat conductivity, such as Nichrome, Inconel, Nilvar, or the like, which constitute the operative or sealing face of the roll. It will be noted that low conductivity layer 23 is substantially wider than the layer of heat insulation and has its lateral marginal portions 24 bent down against the side faces or ends of the body portion and directly secured to such body portion in any suitable manner, such as by spot welding or hard soldering, as indicated at 25. Thus, the said marginal portions 24 of the low conducting layer are in metallic contact and in direct heat transfer relation with the body portion of the roll which is generally formed of brass or some other metal of relatively high heat conductivity.

Underneath the sealing roll 12 there is mounted a pressure roll 13 comprising a body portion 26 of metal mounted for rotation around shaft 27 and bearing a circumferential layer 28 of elastic material, such as a suitable grade of silicone rubber, which constitutes the pressure face of the roll. Preferably, suitable means are provided for urging the pressure roll towards the sealing roll, such biasing means being diagrammatically indicated by means of a compression spring 29.

The heater, sealing and pressure rolls 11, 12, 13 are maintained in continuous rotation by suitable driving means which in the simplest case may be in the form of a motor having its pulley 30 in frictional engagement with the circumferential surface of heater roll 11. This will cause a rotation of heater roll 11, sealing roll 12 and of pressure roll 13, which are in rolling engagement with each other. Arrows indicate the direction of rotation of the several rolls during their cooperation.

From the foregoing description the operation of the machine of the invention will be readily understood by those skilled in the art. When it is desired to produce seals by the machine of the invention, the superposed thermoplastic layers 31 and 32 are introduced into the bight of sealing roll 12 and pressure roll 13. As a result of the rolling contact between the heating face 14 of heater roll 11 and the sealing face 23 of sealing roll 12, heat will be continuously and progressively transferred to and stored in the center portion of the sealing face. During continued rotation of the sealing roll, this preheated area or strip of the sealing roll will be brought into rolling pressure contact with a corresponding area or longitudinally extending strip of the thermoplastic layers 31 and 32 whereby the stored heat is deposited thereon, causing heat sealing thereof in such area. Since the amount of heat stored in the sealing face is limited, most if not all of such heat is dissipated in the production of the seal so that the seal is permitted to cool and to consolidate under pressure, thus producing a strong and sound seal. Any residual heat in the sealing face will pass into the body portion 20 of the sealing roll 12 either by passing through the heat insulating layer 22 or by direct heat conduction in the lateral marginal portions 24 of the sealing layer 23 which are in direct metallic contact with the said body portion. Since the object of the provision of heat insulating layer 22 is not to completely prevent but merely to slow down heat transfer from the sealing face 23 of low conductivity metal to the body portion 20 of high conductivity, it should be of such moderate thickness as is compatible with this function. Thus, as set forth in the foregoing, a glass fiber fabric impregnated with a silicone resin and having a thickness between 0.005" and 0.03" is very satisfactory for the purpose.

It will be noted in Fig. 2 that the sealing roll 12 is considerably wider than the heater roll 11 and that the circumferential face of the heater roll engages only the center portion of the sealing face 23. Furthermore, it will be likewise noted that the pressure roll 13 is also wider than the heater roll 11 and is preferably of the same width as the sealing roll 12. Since heat is stored on and is deposited from the center zone or strip of the sealing face 23 of sealing roll, the regions of the thermoplastic layers laterally adjoining the heated center zone will be likewise placed under compression during the sealing operation but in the absence of sealing heat. This is quite desirable in forming a satisfactory seal as it prevents wrinkling or distortion of the said adjoining regions of the layers.

Figs. 3 and 4 illustrate a portion of the thermoplastic layers 31 and 32 after the sealing operation which produces a longitudinally extending continuous seal 33 permanently bonding the layers together. Of course, instead of passing a pair of continuous thermoplastic layers through the bight of sealing roll 12 and pressure roll 13, a plurality of filled bags formed of thermoplastic material may be successively passed through the bight of the said rolls for applying a top closure seal thereto, as those skilled in the art will readily understand.

During the operation of the heat sealing machine shown in Figs. 1 and 2, after the heat stored in sealing face 23 has been deposited onto thermoplastic layers 31 and 32, any residual heat remaining in the sealing face 23 will be conducted away into the metal body 20 of the sealing roll, either through the thickness of thin heat insulating layer 22 or at the marginal portions 24 of the top metal layer 23, where it will be harmlessly dissipated due to the relatively large heat capacity of the said metal body as compared to the small heat capacity of the sealing face itself. This desirable condition of operation may be assured by properly correlating the temperature of heating face 14 of the heater roll 11 to the speed of rotation of the several rolls and to the amount of heat that is required for sealing the thermoplastic layers 31 and 32. However, particularly at very high speeds of operation, there may be gradual buildup of heat in metal body 20 or in sealing face 23 of the sealing roll. To counteract this tendency, positive cooling of metal body 20 may be provided, for example by forming an axial cavity therein and passing water or some other suitable cooling fluid through such cavity at a controlled rate. Another expedient, which is even more effective, is to provide a cooling roll maintained at a constant low temperature by the passage of a cooling fluid therethrough and to bring the circumferential surface of such cooling roll into rolling contact with the sealing face at a suitable location between the point where the stored heat is deposited onto the thermoplastic layers and the point where sealing heat is again stored in said sealing face as a result of its contact with heating face 14 of heater roll 11. A cooling roll of the described character is diagrammatically indicated in broken lines at 34 in Fig. 1 and is effective in "wiping off" the residual heat from sealing face 23 and to condition it to a uniform low temperature before sealing heat is again stored therein.

It has been noted that the sealing face 23 of sealing roll 12 is constituted by a relatively thin layer of metal of low heat conductivity, the thickness of such layer being, for example, between 0.001" and 0.01". This is desirable in view of the fact that the heat stored will not "spread" as rapidly in a thin sealing layer as in a thick sealing layer. However, the preferred thickness will to a great extent depend on the speed of operation or, in other words, on the interval between the time the heat is stored in the sealing layer and the time such stored heat is deposited on the thermoplastic layers to be sealed. The quicker the sealing operation is carried out, the thicker can be the sealing layer and when the operation of the machine is extremely fast, that is, when the interval of time elapsed between the storing and the deposition of the heat in and from the sealing layer is very short, the sealing member may be formed as a solid integral body of metal having the desired heat conducting characteristics.

The temperature at which the heater roll 11 and its heating face 14 are maintained depends to a substantial extent on the sealing temperature of the thermoplastic layers which are to be bonded together. In general, this constant temperature is selected to be slightly higher than the desired sealing temperature due to the fact that at least some of the heat will be lost by radiation or conduction during the short interval that elapses between the time the heat is stored in the sealing face and is deposited therefrom onto the thermoplastic layers. Also, the width of the heating face 14 of heater roll 11 is preferably somewhat less than the width of the desired seal since at least some "spreading" of the stored heat in the sealing face is difficult to avoid during such interval.

Fig. 5 illustrates a modified heater roll suitable for the purposes of the present invention and particularly adapted to the formation of very narrow seals. The heater roll 11a is in the form of a solid roll or wheel formed of copper, brass or aluminum and having a tapering rim portion 35 terminating in a narrow circumferential surface 14a constituting the heating face of the roll. This roll is rotatably mounted on a stationary shaft 36 having a pair of stationary flanges 37 mounted thereon to prevent lateral displacement of the roll on the shaft. The shaft is provided with an inner cavity or channel 38 in which there is an electrical heating cartridge 39. This heating cartridge may be connected to a source of electric current through leads 40 and 41. As a result of the heating effect of the said cartridge, shaft 36 is heated to a high operating temperature and such temperature is transferred by surface contact to the heater roll. Heater roll 11a cooperates with the sealing face 23a of sealing roll 12a as those skilled in the art will readily understand without any further explanation. The advantage of this modified heater roll is its great simplicity and that simple electrical heating means may be employed without requiring the transmission of electrical energy to a rotating member by means of slip rings and contact brushes.

It will be noted that the present invention provides numerous advantages of which the most important are the following:

1. It is possible to extend the advantages of the thermal impulse principle, that is sealing with a short and highly intense heat pulse and cooling the seal under pressure, to the formation of seals in continuously and progressively displaced thermoplastic layers.

2. Thermoplastic films which are extremely difficult or impossible to seal by conventional procedures, such as particularly Polythene and Saran, are sealed with great facility.

3. In the sealing face, hot sealing regions defining the region to be sealed, coexist with adjoining cool areas in one and the same completely smooth surface. Thus, while the area or areas to be sealed are heated, the adjoining areas are cooled under pressure in the complete absence of any extrusion of the films in the lines defining the hot areas from the cold areas. This is one of the essential requirements of the production of a perfect seal.

4. The method of the invention is carried out in a continuous and progressive manner and for this reason it is readily adaptable to continuously operated heat sealing, bag making, wrapping and packaging machines.

5. Due to the fact that all of the operating elements of the sealing machine of the invention, as well as the thermoplastic layers to be sealed, are displaced in a continuous or rotary fashion, in contrast to the reciprocating motion characteristic of most conventional heat sealing machines, extremely high operating speeds may be obtained.

Although the present invention has been described in connection with a few preferred embodiments thereof, variations and modifications may be resorted to by those skilled in the art without departing from the principles of the present invention. I consider all of these variations and modifications to be within the true spirit and scope of the present invention, as disclosed in the foregoing description and defined by the appended claims.

What is claimed is:

1. In a machine for heat sealing thermoplastic layers, the combination which comprises a sealing roll, a heater roll narrower than said sealing roll having its circumferential surface heated to sealing temperature mounted for rolling contact with an annular central zone of the circumferential surface of said sealing roll thereby progressively to store sealing heat on the said zone of the surface of the sealing roll while maintaining the remainder of said surface below sealing temperature, and means for passing the layers of thermoplastic material in pressure contact with the preheated regions of said sealing roll thereby progressively to deposit such stored heat on said layers and to cause heat sealing thereof in a continuous longitudinal region.

2. In a machine for heat sealing thermoplastic layers, the combination which comprises a sealing roll, a heater roll narrower than said sealing roll mounted for rolling contact with an annular central region of said sealing roll, said heater roll having its circumferential surface maintained at sealing temperature thereby progressively transferring to and storing sealing heat in the corresponding continuous annular contacting region of the sealing roll during rotation of said rolls while maintaining the remainder of said sealing roll below sealing temperature, and a pressure roll mounted for cooperation with said sealing roll for passing the thermoplastic layers in rolling pressure contact with the surface of said sealing roll including both preheated and unheated regions thereby progressively to deposit such stored heat on said layers and to cause the formation of a continuous longitudinal seal therein.

3. In a machine for heat sealing thermoplastic layers, the combination which comprises a heater roll maintained at sealing temperature, a sealing roll of a width greater than that of said heater roll having the center portion of its circumferential surface in rolling contact with the circumferential surface of said heater roll, a pressure roll of a width greater than said heater roll mounted for cooperation with said sealing roll for passing the thermoplastic layers to be sealed in pressure contact with said sealing roll, and means for rotating said rolls whereby sealing heat will be continuously and progressively stored in the annular center portion of the surface of the sealing roll and will be continuously and progressively deposited on said thermoplastic layers causing heat sealing thereof along a continuous longitudinal strip while the regions of said layers laterally adjoining said strip will be placed under pressure in the absence of sealing heat.

4. In a machine for continuously forming a longitudinally extending heat seal in thermoplastic layers, the combination which comprises a sealing roll including a cylindrical body portion of metal, a thin layer of heat insulation thereon, and a layer of metal of lower heat conductivity than that of the metal of the body portion on said layer of insulation and constituting the sealing face of said roll; a heater roll narrower than said sealing roll mounted for cooperation with said sealing roll, said heater roll having its entire circumferential surface maintained at sealing temperature and in rolling contact with the center portion of the circumferential surface of said sealing roll; a pressure roll mounted for cooperation with said sealing roll for passing the thermoplastic layers to be sealed in pressure contact with said sealing roll; and means for rotating said rolls whereby sealing heat will be continuously stored on the sealing face of said sealing roll and will be continuously deposited onto said thermoplastic layers while the residual heat in said sealing face will be continuously withdrawn into the metal body portion of said sealing roll through said layer of heat insulation.

5. In a machine for continuously forming a longitudinally extending heat seal in thermoplastic layers, the combination which comprises a sealing roll including a cylindrical body portion of metal, a thin layer of heat insulation on the circumferential surface of said body portion, and a layer of metal of lower heat conductivity than that of the metal of the body portion on said layer of insulation and having its lateral marginal regions directly secured to the sides of said body portion, the circumferential surface of said layer of metal constituting the sealing face of said roll; a heater roll narrower than said sealing roll mounted for cooperation with said sealing roll, said heater roll having its circumferential surface maintained at sealing temperature and in rolling contact with the center portion of the circumferential surface of said sealing roll; a pressure roll mounted for cooperation with said sealing roll for passing the thermoplastic layers to be sealed in pressure contact with said sealing roll; and means for rotating said rolls whereby sealing heat will be continuously stored on the sealing face of said sealing roll and will be continuously deposited onto said thermoplastic layers while a portion of the residual heat in said sealing face will be continuously withdrawn into the metal body portion of said sealing roll through said layer of heat insulation and the balance of such residual heat will be conducted into said metal body portion through the marginal regions of the sealing face directly connected to the body portion.

6. In a machine for heat sealing thermoplastic layers, the combination which comprises a sealing roll, a heater roll narrower than said sealing roll mounted for rolling contact with the annular central region of said sealing roll, said heater roll having its circumferential surface maintained at sealing temperature thereby transferring to and progressively storing sealing heat in the corresponding continuous contacting central region of the sealing roll during rotation of said rolls while maintaining the remainder of said sealing roll below sealing temperature, a pressure roll mounted for cooperation with said sealing roll for passing the thermoplastic layers in rolling pressure contact with the surface of said sealing roll including both preheated and unheated regions thereby progressively to deposit said stored heat on said layers and to cause heat sealing thereof in a continuous longitudinal region, a cooling roll maintained at a constant low temperature in rolling contact with the portions of the sealing roll from which the stored sealing heat has been already deposited to withdraw any residual heat therefrom, and means for rotating said rolls.

References Cited in the file of this patent
UNITED STATES PATENTS

| Number | Name | Date |
|---|---|---|
| 1,882,925 | Rock | Oct. 18, 1932 |
| 2,114,833 | Fincke | Apr. 19, 1938 |
| 2,238,342 | Riehl | Apr. 15, 1941 |
| 2,424,558 | Delano | July 29, 1947 |
| 2,533,832 | Monroe | Dec. 12, 1950 |
| 2,556,008 | Spalding | June 5, 1951 |
| 2,566,799 | Humphrey | Sept. 4, 1951 |
| 2,574,094 | Fener et al. | Nov. 6, 1951 |